3,061,649
PREPARATION OF 1-ALKENYL ALKYL ETHERS
Julius L. E. Erickson, Baton Rouge, La., and Marvin Z. Woskow, Galveston, Tex., assignors to The Givaudan Corporation, New York, N.Y., a corporation of New Jersey
No Drawing. Filed Jan. 8, 1958, Ser. No. 707,681
3 Claims. (Cl. 260—611)

This invention relates to a novel method for preparing 1-alkenyl alkyl ethers and to novel substances, useful in perfumery, prepared thereby.

We are aware that a few 1-alkenyl alkyl ethers have already been prepared. The method of their preparation involves pyrolyzing acetals in the presence of a catalyst. Besides requiring the use of a catalyst, the known method is disadvantageous in that the acetals must usually be isolated prior to pyrolysis.

We have succeeded, in accordance with this invention, in preparing 1-alkenyl alkyl ethers advantageously from organic 1-alkoxyalkyl esters by heating the latter. Among the advantages of our present process are (1) no catalyst is necessary; (2) only one mole equivalent of alcohol is contained in the 1-alkoxyalkyl esters, as contrasted to two moles in the case of the acetals; and (3) it is unnecessary to isolate the 1-alkoxyalkyl esters in pure form prior to use.

The overall process employed by us in accordance with this invention may be represented by the following sequence of reactions, as typified by the use of sodium acetate as the ester-forming salt:

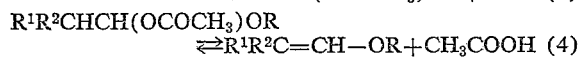

$R^1R^2CHCHO + ROH \rightleftarrows R^1R^2CHCH(OH)OR$ (1)
$R^1R^2CHCH(OH)OR + HCl$
$\rightleftarrows R^1R^2CHCH(Cl)OR + H_2O$ (2)
$R^1R^2CHCH(Cl)OR + NaOCOCH_3$
$\rightarrow R^1R^2CHCH(OCOCH_3)OR + NaCl$ (3)
$R^1R^2CHCH(OCOCH_3)OR$
$\rightleftarrows R^1R^2C=CH-OR + CH_3COOH$ (4)

In the foregoing sequence of reactions, R is selected from the group consisting of primary and secondary alkyl and cycloalkyl groups; and $R^1$ and $R^2$ are selected from hydrogen, primary and secondary alkyl and cycloalkyl groups, and aromatic groups. Examples of operable alkyl groups are methyl, ethyl, n-propyl, isopropyl, n-butyl, isobutyl, n-amyl, isoamyl, hexyl, heptyl, octyl, nonyl, decyl, lauryl, myristyl, cetyl, stearyl, etc. Examples of operable cycloalkyl groups include cyclopropyl, cyclobutyl, cyclopentyl, cyclohexyl, methylcyclohexyl, etc. Examples of operable aromatic groups include phenyl, tolyl, naphthyl, etc.

Among the aldehydes which can be employed in accordance with reaction 1 are the following:

Acetaldehyde, propionaldehyde, n-butyraldehyde, isobutyraldehyde, valeraldehyde, 2-methylbutanal, 3-methylbutanal, hexanal, 2-ethylbutanal, heptanal, octanal, 2-ethylhexanal, nonanal, decanal, lauraldehyde, myristaldehyde, palmitaldehyde, stearaldehyde, etc., hexahydrobenzaldehyde, hexahydrotolualdehyde, etc., β-phenylacetaldehyde, hydrotropic aldehyde, γ-phenylpropionaldehyde, etc.

Alcohols which can be employed in accordance with reaction 1 include the following:

Methyl, ethyl, n-propyl, isopropyl, n-butyl, isobutyl, n-amyl, isoamyl, hexyl, octyl, nonyl, decyl, lauryl, myristyl, cetyl, and stearyl alcohol, etc., 2-methylbutanol, 3-methylbutanol, 2-ethylbutanol and 2-ethylhexanol, etc., benzyl alcohol, β-phenylethyl alcohol, α-phenylethyl alcohol, γ-phenylpropyl alcohol, etc., cyclopentanol, cyclohexanol, etc.

In general, the hemiacetal formed in accordance with reaction 1 is made by mixing together equimolecular quantities of an aldehyde and an alcohol at any convenient temperature. In practice, a temperature within the range from about 40° to 60° C. is desirable as equilibrium is reached in a shorter time than is the case when the reaction is conducted at 0° C. or other lower temperatures.

A trace of HCl will catalyze the equilibrium very rapidly. When HCl is employed, it is important to cool the reactants, e.g., to about 0°–20° C., before passing in the HCl, so as to permit the separation of the mixture into two phases, and thus drive the reaction in the desired direction.

An excess of either aldehyde or alcohol reagent is undesirable. If an excess of aldehyde is used, the excess may form a trimer of the paraldehyde type. If an excess of alcohol is used, the separation of the phases may be prevented, or formed less completely. Obviously, unnecessary excesses are needlessly expensive. A small excess of either reagent, however, is not fatal as no noticeable undesirable effects will normally result.

Reaction 2 above is carried out with dry hydrogen chloride by passing it through the cooled hemiacetal, formed in Reaction 1 until the theoretical amount of gas has been absorbed.

After removal of the water formed during Reaction 2, sodium acetate is treated with the chloro ether formed in Reaction 2, at a temperature from about 70° C. to about 130° C. In place of sodium acetate any ester-forming organic salt may be used. For example, mercury, lead, silver, zinc, calcium or potassium acetate may be used. Also, salts of fatty acids in general, for example, alkali metal salts of propionic, butyric, oxalic, adipic, etc. acids, can be used, if desired. The use of salts which lead to the formation of acetates is especially preferred as the pyrolysis of 1-alkoxyalkyl acetates occurs at a low temperature, since acetic acid is always one of the cleavage products. Accordingly, the detailed descriptions here given deal with the use of sodium acetate. Those skilled in the art will understand, however, that such description is merely by way of illustration and that suitable modifications can be made to utilize other ester-forming salts without the exercise of any invention.

Equimolecular amounts of the sodium acetate and chloro ether are used. If desired, an excess of sodium acetate, up to about 20–30 mole precent, can be used.

After removal of the sodium chloride formed during Reaction 3, the 1-alkoxyalkyl acetate is decomposed by heating. The temperature at which decomposition occurs varies according to the particular acetate employed; but we have found that, in general, temperatures within the range from about 150° C. to about 250° C., for at least two hours, are effective. The desired 1-alkenyl alkyl ether is then separated from the formed acetic acid by distillation followed by washing with alkaline aqueous solution, drying over alkaline material, distillation over alkali hydroxide, and fractionation of the distillate.

The following examples are given to illustrate the manner of carrying out our process.

EXAMPLE I

*Preparation of 1-Hexenyl Ethyl Ether*

α-Chlorohexyl ethyl ether.—Dry hydrogen chloride was passed into a cold mixture of 100 g. (1.0 mole) of freshly distilled hexanal and 46 g. (1.0 mole) of absolute ethanol until 40 g. (1.09 moles) of hydrogen chloride was absorbed. The lower (aqueous) layer was discarded and the upper layer was dried over anhydrous calcium chloride for two hours. The liquid was then kept under partial vacuum for two hours to remove any excess hydrogen chloride. Purification by distillation results in considerable losses and is unnecessary. The yield of crude α-chlorohexyl ethyl ether was 151 g. (0.915 mole, 91.5%), and it is pure enough for use in the next step of the process.

*1-ethoxyhexyl acetate.*—To 82 g. (1.0 mole) of anhydrous sodium acetate in a 300 ml. three-necked flask, fitted with a mechanical stirrer and a reflux condenser protected by a drying tube, was added, all at once, 151 g. (0.915 mole) of a crude α-chlorohexyl ethyl ether which had been cooled to 10° C. The mixture was stirred and heat was evolved. Stirring was continued for two hours and then the mixture was warmed at 120° C. and stirring was continued an additional two hours. After cooling to room temperature, 50 ml. of anhydrous ethyl ether was added to the mixture. The product was then separated from the solid material by filtration, and the solid was washed with another 50 ml. of ether. The ether was removed and the residue was distilled under reduced pressure. The distillate was fractionated to yield 109 g. (0.58 mole) of 1-ethoxyhexyl acetate.

*1-hexenyl ethyl ether.*—Ninety-four grams (0.5 mole) of 1-ethoxyhexyl acetate was heated at 200°–230° C. for two hours, and then distilled slowly to yield 90 g. of a liquid, B.P. 115°–145°. This distillate was washed once with 130 ml. of 20% sodium carbonate solution and twice with 25 ml. portions of the same solution. After being dried over anhydrous sodium carbonate, the remaining 60.1 g. of liquid was distilled over solid potassium hydroxide to yield 57 g. of liquid, B.P. 138°–148°, which, when fractionated gave 54 g. (0.422 mole) of 1-hexenyl ethyl ether.

EXAMPLE II

*Preparation of 2-Methyl-1-Propenyl Ethyl Ether*

Dry hydrogen chloride was passed into a mixture of 72 g. (1.0 mole) of freshly distilled isobutyraldehyde and 46 g. (1.0 mole) of absolute ethanol. The yield of chloro ether was 112 g. (0.82 mole). This was poured, all at once, on 82 g. (1.0 mole) of anhydrous sodium acetate, and the mixture was stirred for two hours at 110° C. The crude acetate was filtered off and then heated at 170° C. for three hours and then allowed to distil slowly at atmosphere pressure. The distillate was washed once with a 100 ml.-portion of 20% sodium carbonate, then twice with 25 ml. portions of 20% sodium carbonate, and once with 15 ml. of water. It was then dried over anhydrous sodium carbonate. Upon distillation, 33 g. (0.33 mole) of 2-methyl-1-propenyl ethyl ether, B.P. 92°–94°, was obtained.

EXAMPLE III

*Preparation of 1-Pentenyl Ethyl Ether*

Dry hydrogen chloride was passed in a mixture of 43 g. (0.5 mole) of freshly distilled n-valeraldehyde and 23 g. (0.5 mole) of absolute ethanol. The yield of crude chloro ether was 57 g. (0.38 mole, 76%). This was added to 41 g. (0.5 mole) of anhydrous sodium acetate and the mixture was stirred for two hours at 100° C. The product was separated from the solid material and distilled to yield 51 g. of a liquid, B.P. 60°–66° (6 mm.), which gave upon fractionation 44 g. (0.253 mole) of 1-ethoxypentyl acetate, B.P. 62.4–63° (6 mm.).

Forty grams (0.23 mole) of the above acetate was heated for one hour at 180° C. and then slowly distilled to yield 35.7 g. of liquid, B.P. 115°–125°. This was washed three times with 20 ml. portions of 20% sodium carbonate solution and once with 10 ml. of water, and dried over anhydrous sodium carbonate. The remaining 25.8 g. of liquid was fractionated to yield 19 g. of 1-pentenyl ethyl ether, B.P. 118°–119°.

EXAMPLE IV

*Preparation of 1-Heptenyl Ethyl Ether*

Dry hydrogen chloride was passed into a mixture of 57 g. (0.5 mole) of heptanal and 23 g. (0.5 mole) of absolute ethanol. The resulting chloro ether, 77 g., was added to 41 g. (0.5 mole) of anhydrous sodium acetate and the mixture was stirred for two hours at 120° C. The liquid product was separated from the solid material and distilled to yield 57 g. of a liquid, B.P. 81°–86° (4 mm.). Upon fractionation there was obtained 54 g. (0.267 mole) of 1-ethoxyheptyl acetate, B.P. 84°–85° (4 mm.).

Forty-six grams (0.227 mole) of the acetate was heated at 240° C. for two hours and then slowly distilled to yield 41 g. of distillate and 5 g. of residue. After washing the distillate with three portions of 20% sodium carbonate solution, and drying, there remained 25 g. which was distilled to yield 21.1 g. (0.149 mole) of 1-heptenyl ethyl ether, B.P. 165°–168°.

EXAMPLE V

*Preparation of 1-Butenyl Butyl Ether*

Dry hydrogen chloride was passed into a mixture of 72 g. (1.0 mole) of n-butyraldehyde and 74 g. (1.0 mole) of n-butyl alcohol. The yield of chloro ether was 138 g. (0.84 mole). This was added to 82 g. (1.0 mole) of sodium acetate, and the mixture was stirred for two hours at 110° C. The liquid product was separated from the solid material and distilled at atmospheric pressure. The distillate, consisting of the pyrolysis products, was washed with sodium carbonate and dried, and distilled to yield 54 g. of 1-butenyl butyl ether, B.P. 64°–66° (40 mm.).

EXAMPLE VI

*Preparation of 2-Methyl-1-Propenyl Isobutyl Ether*

Dry hydrogen chloride was passed into a mixture of 72 g. of isobutyraldehyde and 74 g. of n-butyl alcohol. The yield of chloro ether was 131 g. This was added to 82 g. of sodium acetate and the mixture was stirred for two hours at 110° C., and then the crude acetate was separated from the solid material by filtration. The liquid acetate was then distilled slowly through a fractionating column at atmospheric pressure. The distillate was washed with 20% sodium carbonate solution, and dried, and then fractionated to yield 72 g. (0.563 mole) of 2-methyl-1-propenyl isobutyl ether, B.P. 131°–132°.

EXAMPLE VII

*Preparation of 2-Ethyl-1-Butenyl 2-Ethylbutyl Ether*

Dry hydrogen chloride was passed into a mixture of 50 g. (0.5 mole) of 2-ethylbutanal and 51 g. (0.5 mole) of 2-ethylbutanol until 20 g. of hydrogen chloride was absorbed. The chloro ether (103 g., 0.467 mole, 93.4%) was stirred with 41 g. (0.5 mole) of anhydrous sodium acetate for two hours at 110° C. The crude acetate was filtered off and pyrolyzed directly by distilling slowly at atmospheric pressure. The distillate was washed once with 50 ml. of 20% sodium carbonate solution, twice with 15 ml. portions of 20% sodium carbonate solution, and once with 15 ml. of water, and then was dried for 18 hours over anhydrous sodium carbonate. The remaining 60 g. was fractionated to yield 6.0 g. of a forerun boiling below 121° C., and 47 g. (0.255 mole) of 2-ethyl-1-butenyl 2-ethylbutyl ether, B.P. 90°–90.5° (11 mm.).

EXAMPLE VIII

*Preparation of 2-Ethyl-1-Hexenyl 2-Ethylhexyl Ether*

Dry hydrogen chloride was passed into a mixture of 64 g. (0.5 mole) of 2-ethylhexanal and 65 g. (0.5 mole) of 2-ethylhexanol until 20 g. of hydrogen chloride was absorbed. The chloro ether (130 g., 0.47 mole, 94%) was stirred with 41 g. (0.5 mole) of anhydrous sodium acetate for three hours at 125° C. The crude acetate was filtered off and pyrolyzed directly by heating for three hours at 250° C., and then distilling slowly at atmospheric pressure. The distillate was washed with an excess of 20% sodium carbonate solution, then with water, and was dried over anhydrous sodium carbonate. The 57 g. of liquid which remained was fractionated to yield 48 g.

(0.20 mole) of 2-ethylhexenyl 2-ethylhexyl ether, B.P. 135°–136° (10 mm.).

Using a procedure in accordance with the foregoing we also prepared vinyl ethyl ether, 1-propenyl ethyl ether and 1-butenyl ethyl ether.

The properties of the 1-alkoxyalkyl acetates prepared in accordance with the foregoing examples are given in Tables I and II.

TABLE I.—NOVEL 1-ALKOXYALKYL ACETATES

| Acetate | Yield,[1] percent | B.P.,[2] °C. | Mm. | $n_D^{25}$ | $d_4^{25}$ |
|---|---|---|---|---|---|
| 1-ethoxy-2-methylpropyl | 50.0 | 49.5–52 | 10 | 1.3991 | 0.9125 |
| 1-ethoxypentyl | 50.5 | 62.4–62.8 | 6 | 1.4063 | 0.9057 |
| 1-ethoxyhexyl | 58.0 | 70.5–71.5 | 4 | 1.4108 | 0.9041 |
| 1-ethoxyheptyl | 53.4 | 84 –85 | 4 | 1.4150 | 0.8993 |
| 1-butoxybutyl | 46.81 | 69 –72 | 4 | 1.4102 | 0.9016 |
| 1-isobutoxy-2-methylpropyl | 63.30 | 55– 56.5 | 4 | 1.4058 | 0.8833 |

[1] Based on aldehyde.  [2] Boiling points are uncorrected.

TABLE II.—1-ALKOXYALKYL ACETATES

| Acetate | MR_D | | Analyses | | | |
|---|---|---|---|---|---|---|
| | | | Carbon | | Hydrogen | |
| | Calc'd | Found | Calc'd | Found | Calc'd | Found |
| 1-ethoxy-2-methylpropyl | 42.42 | 42.42 | 59.98 | 60.37 | 10.07 | 10.40 |
| 1-ethoxypentyl | 47.22 | 47.04 | 62.04 | 61.93 | 10.41 | 10.29 |
| 1-ethoxyhexyl | 51.61 | 51.66 | 63.79 | 64.22 | 10.71 | 10.96 |
| 1-ethoxyheptyl | 56.20 | 56.30 | 65.31 | 64.66 | 10.96 | 10.84 |
| 1-butoxybutyl | 51.68 | 51.66 | 63.79 | 63.61 | 10.71 | 10.68 |
| 1-isobutoxy-2-methylpropyl | 52.26 | 51.66 | 63.79 | 63.53 | 10.71 | 10.62 |

The properties of the 1-alkenyl alkyl ethers prepared in accordance with the foregoing examples are given in Tables III and IV.

TABLE III.—1-ALKENYL ALKYL ETHERS

| Ether | Yield,[1] Percent | Yield,[2] Percent | B.P.,[3] °C. | $n_D^{25}$ | $d_4^{25}$ |
|---|---|---|---|---|---|
| 2-methyl-1-propenyl ethyl | 70.5 | 33.0 | 92– 94 | 1.4060 | 0.7772 |
| 1-pentenyl ethyl | 72.5 | 36.7 | 118–119 | 1.4107 | 0.7884 |
| 1-hexenyl ethyl | 84.4 | 49.0 | 144–147 | 1.4160 | 0.7915 |
| 1-heptenyl ethyl | 65.5 | 35.0 | 165–168 | 1.4236 | 0.8033 |
| 1-butenyl butyl | 73.4 | 42.2 | [4] 64– 66 | 1.4151 | 0.7898 |
| 2-methyl-1-propenyl isobutyl | 71.3 | 56.3 | 131–132 | 1.4138 | 0.7825 |
| 2-ethyl-1-butenyl 2-ethylbutyl | [5] | 51 | [6] 90– 90.5 | 1.4350 | 0.8150 |
| 2-ethyl-1-hexenyl 2-ethylhexyl | [5] | 40 | [7] 135–136 | 1.4434 | 0.8199 |

[1] Based on 1-alkoxyalkyl acetate.  [2] Based on aldehyde.  [3] Boiling points are uncorrected.  [4] 40 mm.  [5] No corresponding acetate prepared.  [6] 11 mm.  [7] 10 mm.

TABLE IV.—1-ALKENYL ALKYL ETHERS

| Ether | MR_D | | Analyses | | | |
|---|---|---|---|---|---|---|
| | | | Carbon | | Hydrogen | |
| | Calc'd | Found | Calc'd | Found | Calc'd | Found |
| 2-methyl-1-propenyl ethyl | 31.59 | 31.10 | | | | |
| 1-pentenyl ethyl | 35.85 | 35.70 | 73.63 | 73.15 | 12.36 | 12.20 |
| 1-hexenyl ethyl | 40.57 | 40.31 | 74.94 | 74.67 | 12.58 | 12.63 |
| 1-heptenyl ethyl | 45.07 | 44.93 | | | | |
| 1-butenyl butyl | 40.62 | 40.31 | | | | |
| 2-methyl-1-propenyl isobutyl | 40.86 | 40.32 | 74.94 | 75.05 | 12.58 | 12.38 |
| 2-ethyl-1-butenyl 2-ethylbutyl | 58.90 | 58.79 | 78.19 | 77.77 | 13.13 | 13.34 |
| 2-ethyl-1-hexenyl 2-ethylhexyl | 77.65 | 77.26 | | | | |

The following example shows the desirable odoriferous properties of 1-hexenyl ethyl ether.

EXAMPLE IX

The Perfumery Use of 1-Hexenyl Ethyl Ether

A sample of 1-hexenyl ethyl ether was examined organoleptically. Its odor which persisted for about four hours on a smelling blotter can be described as a green lavender note. It was judged that a substance with such odoriferous properties would be useful as a top note in lavender and petitgrain compositions.

Tests were run to determine the utility of 1-hexenyl ethyl ether in lavender and petitgrain type perfume compositions and to determine if 1-hexenyl ethyl ether had the stability and other desirable qualities that would make it useful as an ingredient of perfumes intended for scenting soap and cosmetics. It was found that 1-hexenyl ethyl ether gives soap a stable odor and does not cause discoloration.

In perfume compositions, 1-hexenyl ethyl ether gives a green leafy top note which recalls a note of both lavender and petitgrain and which permits greater realism in synthetic lavender and petitgrain compositions especially when the natural oils are being avoided.

Soap cakes containing 1% of hexenyl ethyl ether were prepared as follows:

One hundred grams of white number one standard unperfumed soap stock was milled in a porcelain mortar until it was reduced to a fine powder. One gram of 1-hexenyl ethyl ether was added to the soap which was again milled until the soap and perfume were intimately mixed. Ten grams of distilled water was added and the mixture was again milled to a homogeneous plastic mass. Twenty grams of this mixture was placed in a cylindrical stainless steel tableting die and pressed in a hand arbor press to produce a soap cake 3.7 cm. in diameter and 2.0 cm. thick.

These cakes were left exposed to daylight and air for a period of three months and were examined periodically: weekly during the first month and monthly thereafter.

The 1-hexenyl ethyl ether gave the soap cakes a pleasant green leafy odor which covered the natural odor of the soap stock very well. For the entire duration of the exposure, the green leafy odor persisted and the soap stock odor which is expected to become more intense under these conditions remained well covered.

A synthetic lavender composition was formulated as follows:

| | |
|---|---|
| Dihydroterpinyl acetate | 38.0 |
| Terpinyl propionate | 19.0 |
| Caryophyllene | 3.0 |
| Capryl alcohol | 5.0 |
| Borneol | 5.0 |
| Dihydromyrcene | 2.0 |
| Geraniol pure | 2.0 |
| Aldehyde C–9 10% in diethyl phthalate | .5 |
| 1-carvone | .5 |
| Methyl amyl ketone | .5 |
| Ketone A 11984 | 5.5 |
| Terpinolene | 1.0 |
| Ether P 5711 | 5.0 |
| Citronellal 10% in diethyl phthalate | 4.0 |
| Cuminic aldehyde 1% in diethyl phthalate | 2.0 |
| Nonyl acetate | 2.0 |
| Nonoic acid | 5.0 |
| | 100.0 |

To 50 parts of this mixture 3.0 parts of 1-hexenyl ethyl ether were added. Samples of the mixture with the 1-hexenyl ethyl ether and without the 1-hexenyl ethyl ether were taken on smelling blotters and examined organoleptically.

It was found that the mixture without 1-hexenyl ethyl ether had a lavender-like odor but with a coarse chemical quality that limited its appeal as a perfume composition. The mixture containing the 1-hexenyl ethyl ether was found to have a more realistic lavender-like odor due to its fragrant leafy top note.

The foregoing illustrates the practice of our invention, which, however, is not to be limited thereby but is to be construed as permissible in view of the prior art and limited solely by the appended claims.

What is claimed is:

1. The process for making 1-alkenyl alkyl ethers, which comprises decomposing by heat a 1-alkoxyalkyl acetate having the formula, $R^1R^2CHCH(OCOCH_3)OR$, wherein R is a member selected from the group consisting of an aralkyl group, a primary alkyl group, a secondary alkyl group and a cycloalkyl group, and $R^1$ and $R^2$ are members selected from the group consisting of hydrogen, a primary alkyl group, a secondary alkyl group, a cycloalkyl group and an aromatic group.

2. The process of claim 1, wherein R is $C_2H_5$, $R^1$ is n-$C_4H_9$ and $R^2$ is H.

3. The process of claim 1, wherein R is $C_2H_5$, $R^1$ is n-$C_5H_{11}$ and $R^2$ is H.

References Cited in the file of this patent

UNITED STATES PATENTS

| | | |
|---|---|---|
| 2,667,517 | Longley | Jan. 26, 1954 |
| 2,723,287 | Copenhaver | Nov. 8, 1955 |

OTHER REFERENCES

Reppe: Acetylene Chemistry (1949), PB Report 18852–S, p. 37.

Erickson et al.: Journal of Organic Chemistry, vol. 23, No. 5 (1958), pp. 670–672.

(Copies in Library.)

Killian et al.: Jour Amer Chem. Soc. vol. 57 (1935), pp. 544–545.

Bauer: 628 O. G. 257, November 1, 1949 (copies in Lib.).